(12) United States Patent
Ling et al.

(10) Patent No.: US 9,430,378 B2
(45) Date of Patent: *Aug. 30, 2016

(54) DIFFERENTIAL DELAY COMPENSATION

(71) Applicant: Micron Technology, Inc., Boise, ID (US)

(72) Inventors: Jing Ling, Fremont, CA (US); Soowan Suh, San Ramon, CA (US); Juan-Carlos Calderon, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/825,976

(22) Filed: Aug. 13, 2015

(65) Prior Publication Data

US 2015/0350114 A1 Dec. 3, 2015

Related U.S. Application Data

(63) Continuation of application No. 13/942,339, filed on Jul. 15, 2013, now Pat. No. 9,110,794, which is a continuation of application No. 13/229,455, filed on Sep. 9, 2011, now Pat. No. 8,488,631, which is a continuation of application No. 11/093,907, filed on Mar. 30, 2005, now Pat. No. 8,018,926.

(51) Int. Cl.

| | |
|---|---|
| *H04L 12/879* | (2013.01) |
| *H04L 12/747* | (2013.01) |
| *G06F 12/06* | (2006.01) |
| *H04J 3/06* | (2006.01) |
| *H04L 12/861* | (2013.01) |
| *H04L 12/935* | (2013.01) |

(52) U.S. Cl.

CPC ............ *G06F 12/06* (2013.01); *H04J 3/0623* (2013.01); *H04L 45/742* (2013.01); *H04L 49/90* (2013.01); *H04L 49/901* (2013.01); *H04J 2203/0094* (2013.01); *H04L 49/30* (2013.01)

(58) Field of Classification Search

None

See application file for complete search history.

(56) References Cited

U.S. PATENT DOCUMENTS

| | | |
|---|---|---|
| 4,357,681 A | 11/1982 | Chadra |
| 4,392,207 A | 7/1983 | Dockal |
| 5,119,290 A | 6/1992 | Loo et al. |
| 5,179,686 A | 1/1993 | White |
| 5,905,725 A | 5/1999 | Sindhu et al. |
| 6,055,285 A | 4/2000 | Alston |
| 6,279,095 B1 | 8/2001 | Landau |
| 6,675,327 B1 | 1/2004 | Mobin et al. |
| 6,697,368 B2 | 2/2004 | Chang et al. |
| 6,775,302 B1 | 8/2004 | Shaffer et al. |

(Continued)

OTHER PUBLICATIONS

ITU-T Telecommunication Sector of ITU, G. 707/Y.1322, (Oct. 2000), 184 pgs.

(Continued)

*Primary Examiner* — Vincelas Louis
(74) *Attorney, Agent, or Firm* — Schwegman Lundberg & Woessner, P.A.

(57) ABSTRACT

In one embodiment, a method includes receiving a plurality of data frames representing at least one virtually concatenated data stream, storing the plurality of data frames in a memory; and recording, for each of a plurality of data frames, a physical write address that indicates a position in the memory and a virtual write address that includes a multiframe indicator and a byte number indicator.

20 Claims, 7 Drawing Sheets

(56) References Cited

U.S. PATENT DOCUMENTS

| | | |
|---|---|---|
| 6,782,466 B1 | 8/2004 | Steele et al. |
| 6,917,630 B1 | 7/2005 | Russell et al. |
| 6,944,168 B2 | 9/2005 | Paatela et al. |
| 7,296,139 B1 | 11/2007 | Case et al. |
| 7,315,540 B2 | 1/2008 | Bosshart |
| 7,508,830 B1 | 3/2009 | Suh et al. |
| 7,606,269 B1 | 10/2009 | Suh et al. |
| 8,018,926 B2 | 9/2011 | Ling |
| 8,488,631 B2 | 7/2013 | Ling et al. |
| 9,110,794 B2 | 8/2015 | Ling et al. |
| 2002/0083292 A1 | 6/2002 | Isomura et al. |
| 2003/0095563 A1* | 5/2003 | Wu .............. H04J 3/0602 370/442 |
| 2004/0037182 A1 | 2/2004 | Hayashi |
| 2005/0094669 A1* | 5/2005 | Bhardwaj ......... H04J 3/0623 370/476 |
| 2006/0256710 A1 | 11/2006 | Suh et al. |
| 2011/0317721 A1 | 12/2011 | Ling et al. |
| 2013/0305010 A1 | 11/2013 | Ling et al. |

OTHER PUBLICATIONS

ITU-T Telecommunication Sector of ITU, G. 709/Y.1331, (Feb. 2001), 79 pgs.

"Architecture of Optical Transport Networks", Series G: Transmission Systems and Media, Digital Systems and Networks; ITU-T, G.872, (Feb. 1999), 37 pgs.

"Common Switch Interface Specification—L1", CSIX-L1, Version 1.0, (Aug. 2000), 68 pgs.

"Control of Jitter and Wander within Digital Networks Based on SDH", Digital Networks, ITU, G.825, (Mar. 1993), 8 pgs.

"Digital Line Systems Based on SDH for Use on Optical Fibre Cables", Digital Sections and Digital Line Systems, ITU, G.958, (Nov. 1994), 25 pgs.

"Internetworking Technology Overview", Ethernet/IEEE 802.3, Chapter 7, (Jun. 1999), 24 pgs.

"Link Capacity Adjustment Scheme (LCAS) for Virtual Concatenated Signals", ITU-T, G.7042/Y.1305, (Mar. 2006), 38 pgs.

"Optical Interfaces for Equipment and Systems Relating to SDH", Series G: Transmission Systems and Media, Digital Systems and Networks, ITU, G.957, (Jun. 1999), 38 pgs.

"PCI Local Bus Specification", Revision 2.2, (Dec. 1998), 322 pgs.

"PCI-X Addendum to the PCI Local Bus Specification", Revision 1.0a, (Jul. 2000), 240 pgs.

"Synchronous Optical Network (SONET) Basic Description Including Multiplex Structure, Rates, and Formats", ANSI T1.105, (May 2001), 107 pgs.

"Synchronous Optical Network (SONET) Transport Systems: Common Generic Criteria—TSGR", GR-253-CORE; FR-440, Bellcore, (Dec. 1995), 786 pgs.

"System Packet Interface Level 4 (SPI-4) Phase 2 Revision 1: OC-192 System Interface for Physical and Link Layer Devices", OIF-SPI-4-02.1, (Oct. 2003), 66 pgs.

"TDM Fabric to Framer Interface Implementation Agreement", OIF-TFI-5-01.0, (Sep. 2003), 71 pgs.

"Transmission and Multiplexing (TM); Optical Interfaces for Equipments and Systems Relating to the Synchronous Digital Hierarchy (SDH)", ETS 300 232 Amendment A1, ITU, G.957, (Mar. 1996), 6 pgs.

* cited by examiner

DIFFERENTIAL DELAY COMPENSATION

PRIORITY APPLICATION

This application is a continuation of U.S. application Ser. No. 13/942,339, filed Jul. 15, 2013, now issued as U.S. Pat. No. 9,110,794, which is a continuation of U.S. application Ser. No. 13/229,455, filed Sep. 9, 2011, now issued as U.S. Pat. No. 8,488,631, which is a continuation of U.S. application Ser. No. 11/093,907, filed Mar. 30, 2005, now issued as U.S. Pat. No. 8,018,926, each of which is incorporated herein by reference in its entirety.

BACKGROUND

The subject matter described herein relates generally to the field of electronic communication and more particularly to differential delay compensation.

Communication networks transmit data from an originator to a destination via a communication network that may include multiple transfer points, such as hardware routers, that receive data typically in the form of packets or data frames. Data transmission over fiber optics networks may conform to SONET and/or SDH standards. SONET and SDH are a set of related standards for synchronous data transmission over fiber optic networks. SONET is short for Synchronous Optical NETwork and SDH is an acronym for Synchronous Digital Hierarchy.

SONET/SDH networks may employ virtually concatenated payloads. Virtual concatenation partitions payload data into multiple virtual containers that may be assigned a single index, referred to as a Multiframe Indicator (MFI), and transmitted contemporaneously across different transmission media and/or different network paths. Because the payload data traverses different network paths, payload data transmitted contemporaneously can be received at different times, an effect referred to as differential delay. Differential delay can also result from pointer processing, or from other considerations.

Virtual concatenation compensates for differential delay at the receiving entity by reassembling the payload in an appropriate time-ordered sequence. Data from different members of a virtual concatenation group are stored in a memory at the receiver. Processing logic in the destination node reads payload data from members having the same MFI contemporaneously. To do this, the destination node may determine memory locations of members in the same group having the same MFI value at the same byte within the frame so that the data can be assembled correctly at the output of the data memory. Addressing data in this arrangement can be complex, as data is being received, assembled, and processed at varying points and may require data reading from or writing to the memory based on a variety of circumstances.

BRIEF DESCRIPTION OF THE DRAWINGS

The detailed description is described with reference to the accompanying figures.

DETAILED DESCRIPTION

Described herein are exemplary systems and methods for differential delay compensation in a communication system. In the following description, numerous specific details are set forth in order to provide a thorough understanding of various embodiments. However, it will be understood by those skilled in the art that the various embodiments may be practiced without the specific details. In other instances, well-known methods, procedures, components, and circuits have not been described in detail so as not to obscure the particular embodiments.

The methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods.

Figure 1A:
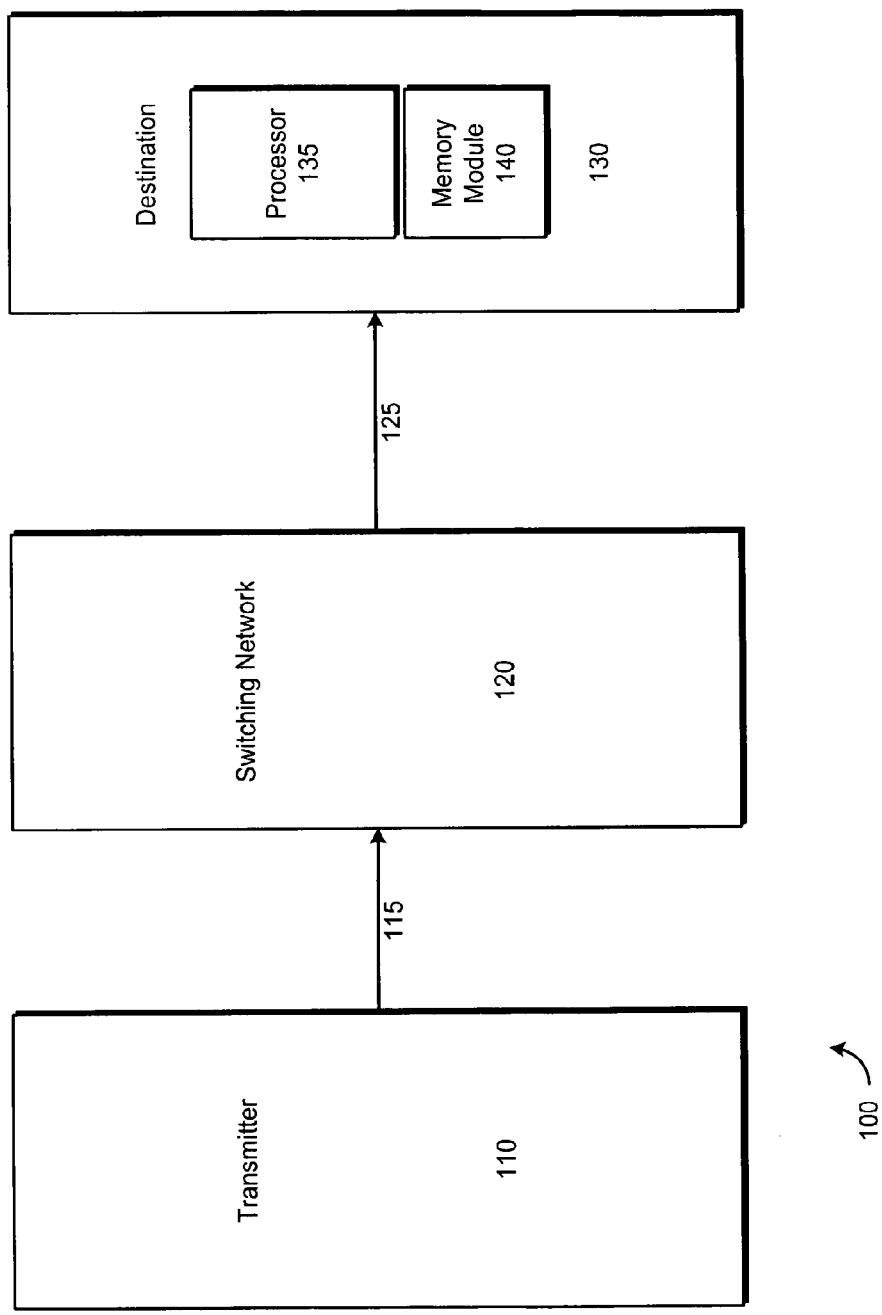
FIG. 1A is a schematic illustration of a SONET/SDH communication system in accordance with one embodiment.

FIG. 1A is a schematic illustration of a SONET/SDH communication switching system in accordance with one embodiment. Referring to FIG. 1A, SONET/SDH switching system 100 includes a transmitter 110 connected through a communication pathway 115 to a switching network 120. Switching network 120 is connected through a communication pathway 125 to a destination 130.

Transmitter 110 transmits data as a series of payloads/frames to the destination 130 through the switching network 120. Packets may pass through a variety of hardware and/or software components, such as servers, routers, switches, etc. in transmission across switching network 120. As each frame arrives at a hardware and/or software component, the component may store the frame briefly before transmitting the frame to the next component. The frames proceed through the network until they arrive at the destination 130. The destination 130 may contain one or more processors 135 and/or one or more memory modules 140.

Figure 1B:
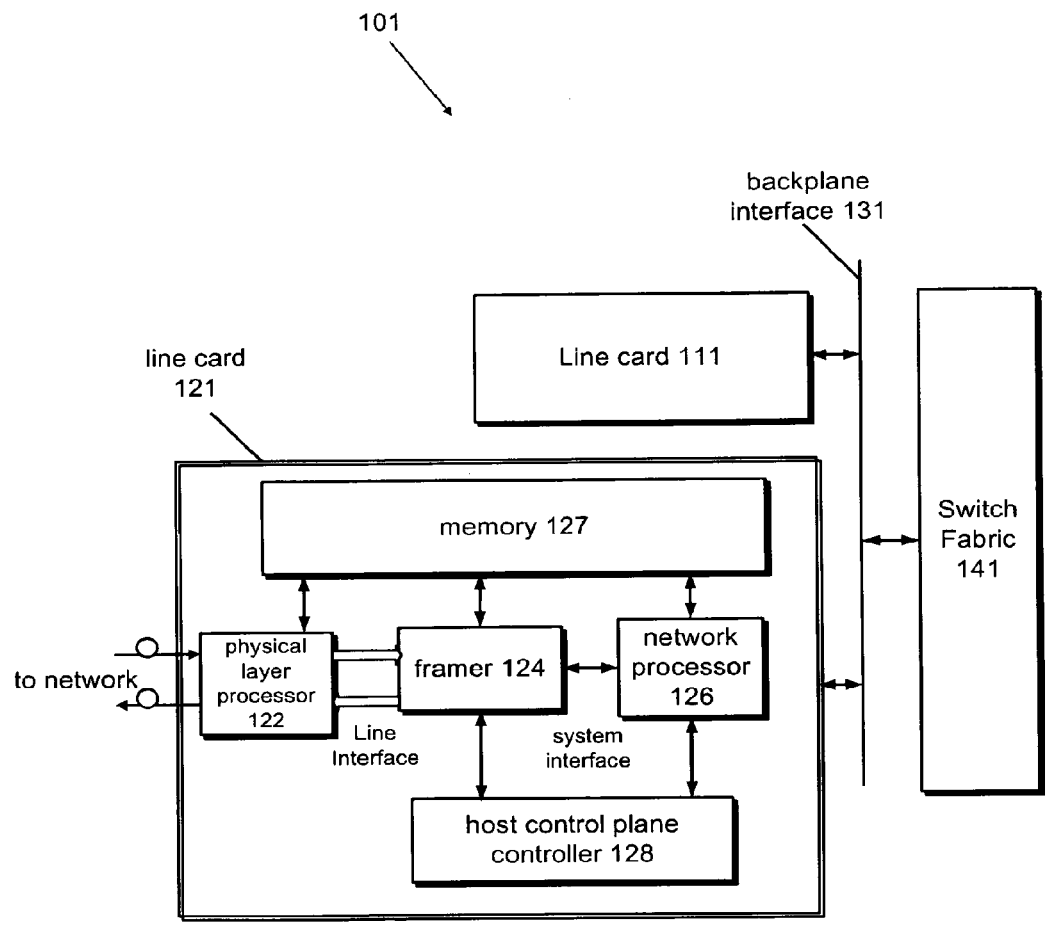
FIG. 1B is a schematic illustration of a suitable system in accordance with one embodiment.

FIG. 1B is a schematic illustration of a suitable system in accordance with one embodiment. The system 101 may include a line card 111, a line card 121, a switch fabric 141, and a backplane interface 131. Line card 111 may be implemented as a SONET/SDH add-drop multiplexer, a Fibre Channel compatible line input, an Ethernet line input, a SONET/SDH line input, or the like.

Line card 121 may be implemented as a transceiver capable of transmitting and receiving frames and/or packets to and from a network that is compatible with SONET/SDH as well as other protocols such as OTN, TFI-5, and Ethernet, although other standards may be used. For example, SONET/SDH and OTN are described for example in: ITU-T Recommendation G.709 Interfaces for the optical transport network (OTN) (2001); ANSI T1.105, Synchronous Optical Network (SONET) Basic Description Including Multiplex Structures, Rates, and Formats; Bellcore Generic Requirements, GR-253-CORE, Synchronous Optical Network (SONET) Transport Systems: Common Generic Criteria (A Module of TSGR, FR-440), Issue 1, December 1994; ITU Recommendation G.872, Architecture of Optical Transport Networks, 1999; ITU Recommendation G.825, "Control of Jitter and Wander within Digital Networks Based on SDH" March, 1993; ITU Recommendation G.957, "Optical Interfaces for Equipment and Systems Relating to SDH", July, 1995; ITU Recommendation G.958, Digital Line Systems based on SDH for use on Optical Fibre Cables, November, 1994; and/or ITU-T Recommendation G.707, Network Node Interface for the Synchronous Digital Hierarchy (SDH) (1996). For example, an implementation of TFI-5 is described in TFI-5: TDM Fabric to Framer Interface Implementation Agreement (2003) available from the Optical Internetworking Forum (OIF). For example, IEEE 802.3 describes Ethernet standards.

Switching network 120 may be any network such as the Internet, an intranet, a local area network (LAN), storage area network (SAN), a wide area network (WAN). One embodiment of line card 121 may include physical layer processor 122, framer 124, network processor 126, and host-control plane controller 128.

Physical layer processor 122 may receive optical or electrical signals from the network and prepare the signals for processing by downstream elements such as framer 124. For example, for frames and/or packets received from the network, physical layer processor 122 may convert an optical signal to electrical format and/or remove jitter from signals from the network. For frames and/or packets to be transmitted to the network, physical layer processor 122 may remove jitter from signals provided by upstream devices such as framer 124 and prepare signals for transmission to the network, which may be optical or electrical format.

Framer 124 may utilize techniques described herein to process frames and/or packets received from a network. Framer 124 may transfer overhead from frames and/or packets to a higher layer level processor such as a network processor 126. For example, framer 124 and network processor 126 may communicate using an interface compatible for example with SPI-4 (described for example in the Optical Internetworking Forum (OIF Document) OIF-SPI4-02.1 and ITU-T G.707 2000, T1.105-2001 (draft), T1.105.02-1995, and ITU-T recommendations G.7042 and G.707), although interfaces compatible with other standards may be used.

Network processor 126 may perform layer 2 or layer 3 (as well as other higher layer level) processing on frames and/or packets provided by and to framer 124 in conformance with applicable link, network, transport and application protocols. Network processor 126 also may perform traffic management at the IP layer.

Host-control plane controller 128 may configure operation of framer 124 and network processor 126. For example, host-control plane controller 128 may program/provision framer 124 to control the content of frames. Host-control plane controller 128 may be implemented as separate from network processor 126 and communicate with the framer 124 and network processor 126 using an interface that complies with Peripheral Component Interconnect (PCI) Local Bus Specification, Revision 2.2, Dec. 18, 1998 available from the PCI Special Interest Group, Portland, Oreg., U.S.A. (as well as revisions thereof) or PCI-X Specification Rev. 1.0a, Jul. 24, 2000, available from the aforesaid PCI Special Interest Group, Portland, Oreg., U.S.A., although other standards may be used. Host-control plane controller 128 could be implemented as part of network processor 126, although other implementations may be used.

In one embodiment, one or more of physical layer processor 122, framer 124, or network processor 126 may be coupled to volatile and/or nonvolatile memory module 127. For example, memory module 127 may include one or more of the following: read-only memory (ROM), programmable ROM (PROM), erasable PROM (EPROM), electrically EPROM (EEPROM), a disk drive, a floppy disk, a compact disk ROM (CD-ROM), a digital video disk (DVD), flash memory, a magneto-optical disk, or other types of nonvolatile machine-readable media suitable for storing electronic instructions and/or data.

In one embodiment, components of line card 121 may be implemented among the same integrated circuit. In another embodiment, components of line card 121 may be implemented among several integrated circuits that communicate using, for example, a bus or conductive leads of a printed circuit board.

Backplane interfaces 131 may be implemented as a single or multi-pin interface and may be used by line cards to interface with system fabric 141. For example, backplane interfaces 131 may be compatible with TFI-5 or CSIX (described in CSIX-L1: Common Switch Interface Specification-L1 (2000)), although other standards may be used. Switch fabric 141 may transfer IP packets or Ethernet packets (as well as other information) between line cards based on relevant address and header information. Switch fabric 141 can be implemented as a packet switch fabric or a TDM cross connect. Switch fabric 141 can be any device (or devices) that interconnect numerous dataplanes of subsystems (i.e., linecards) together.

SONET/SDH defines optical carrier levels and electrically equivalent synchronous transport signals (STSs) for the fiber-optic based hierarchy. In SONET, any type of service, ranging from voice to high speed data and video, can be accepted by various types of service adapters. A service adapter maps the signal into the payload envelope of the STS-1 or virtual tributary. All inputs received are converted to a base format of a synchronous signal, referred to as STS-1, which transmits at 51.84 Mbps (or higher). Several synchronous STS-1s may be multiplexed together to form a higher-level STS-n signal, which are integer multiples of an STS-1 signal.

SONET networks transmit data in frames, which include a transport overhead and a synchronous payload envelope (SPE). An SPE includes an STS path overhead section and a payload section, which holds the data being transported over the SONET network. Once the payload is multiplexed into the SPE and transmitted, the payload is not examined at intermediate nodes.

SONET/SDH architecture supports virtual concatenation. In virtual concatenation a large payload may be divided into a group of smaller payloads, which may be transmitted contemporaneously across different communication channels. Each SPE within a concatenated group contains an identifier, called a Multi-Frame Identifier, or MFI. The MFI forms part of the SONET/SDH path overhead information in the SPE and indicates the SPE's sequence and position within the group.

Virtual concatenation does not require intermediate node support. To compensate for differential delay, a receiver at the destination temporarily stores frames in a memory so that the payload data can be properly realigned. Applying an address calculation method that allows continuous data storage from members (i. e., time slots) in virtually concatenated groups permits the efficient use of the memory, thereby increasing the differential delay range which may be compensated for a given memory size. In one embodiment, a 1-byte wide on-chip memory is used as an example. The scheme can be extended for wider memory or for external memory modules. On-chip memory or external RAM modules can be used as a memory.

Figure 2A:
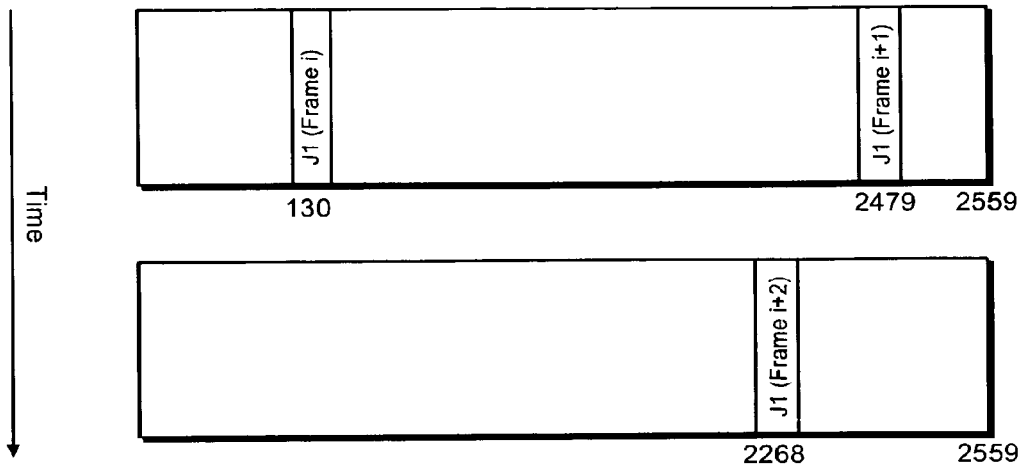
FIG. 2A is a schematic illustration of write operations into a memory at a receiver.
Figure 3:
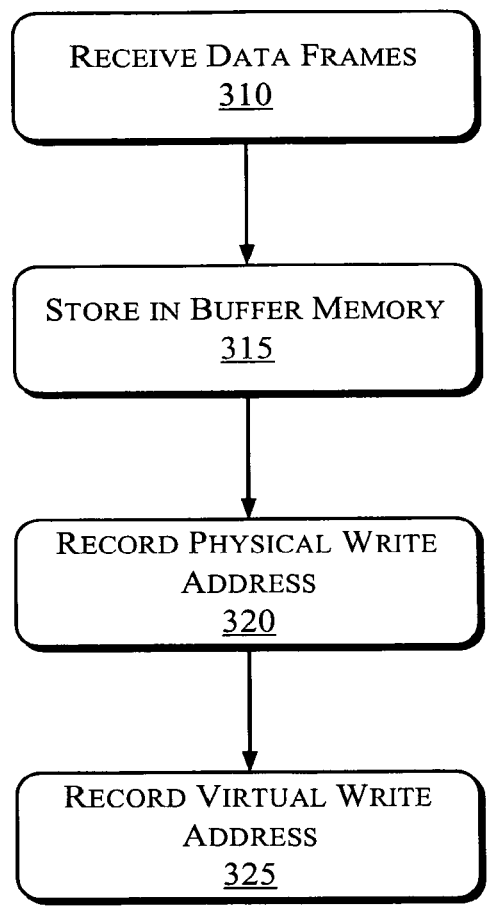
FIG. 3 is a flowchart illustrating operations in one embodiment of a method for writing data frames into a memory.

Exemplary operations for writing received data frames into a memory are explained with reference to FIG. 2A and FIG. 3. FIG. 2A is a schematic illustration of a memory at a receiver, and FIG. 3 is a flowchart illustrating operations in one embodiment of a method for writing data frames into a memory such as the buffer illustrated in FIG. 2A. Referring to FIG. 3, at operation 310 data frames are received at a destination node in a communication network. At operation 315 the payload data from the received data frames are stored in a memory. At operation 320 the physical write address at which a received frame is written in memory is recorded in a suitable memory, for example a flip-flop or other memory device. In one embodiment the physical write address corresponds to a physical location in the memory. At operation 325 a virtual write address is recorded in a suitable memory, for example a flip-flop or other memory device. In one embodiment the virtual write address includes the MFI value associated with the received data frame and the byte number for the last received byte.

As illustrated in FIG. 2A, the payload data frames received at the receiver may be written into the memory continuously. The physical write address is incremented continuously as frames are received. FIG. 2A illustrates an embodiment in which a 2.5 KB (2560 bytes) memory is used to store STS-3c payloads, which include 2349 bytes per frame. In this example the J1 byte for a given frame i is stored at address 130, and the J1 byte for frame i+1 and frame i+2 are stored at address 2479 and 2268, respectively. Writing data to the memory in a continuous fashion makes efficient use of the memory.

Figure 2B:
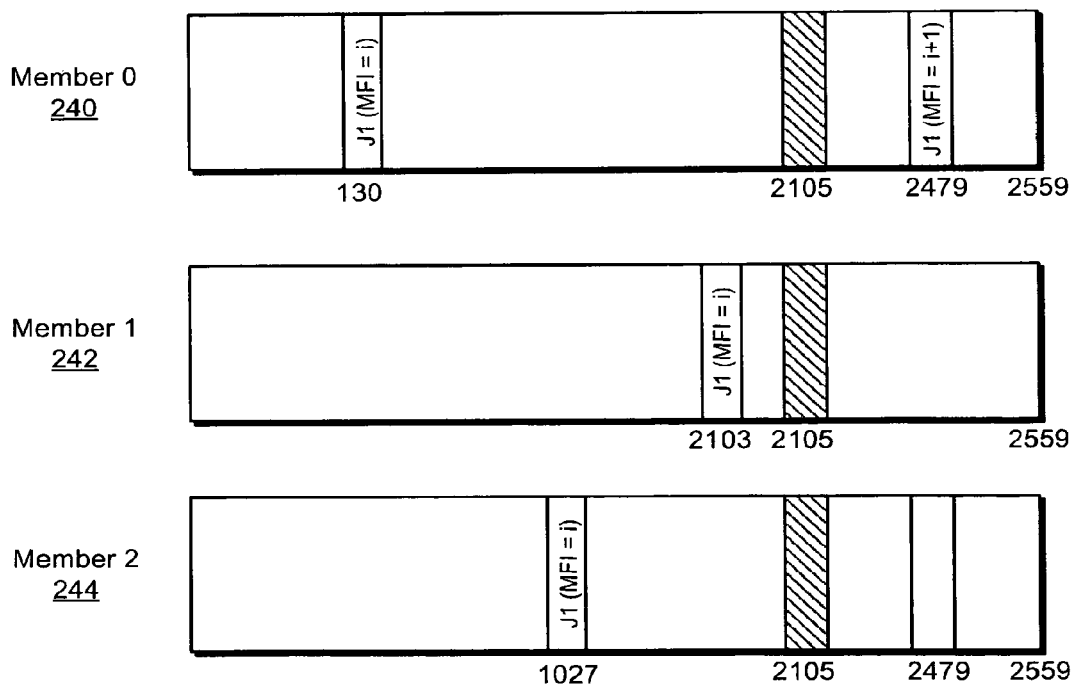
FIG. 2B is a schematic illustration of a memory at a receiver in accordance with one embodiment.

To compensate for differential delay, data frames from different members having the same MFI and same byte number may be read at the same time. Exemplary operations for reading received data frames into a memory are explained with reference to FIG. 2B and FIG. 4. FIG. 2B is a schematic illustration of a memory at a receiver, and FIG. 4 is a flowchart illustrating operations in one embodiment of a method for reading data frames from a memory such as the buffer illustrated in FIG. 2B.

Figure 4:
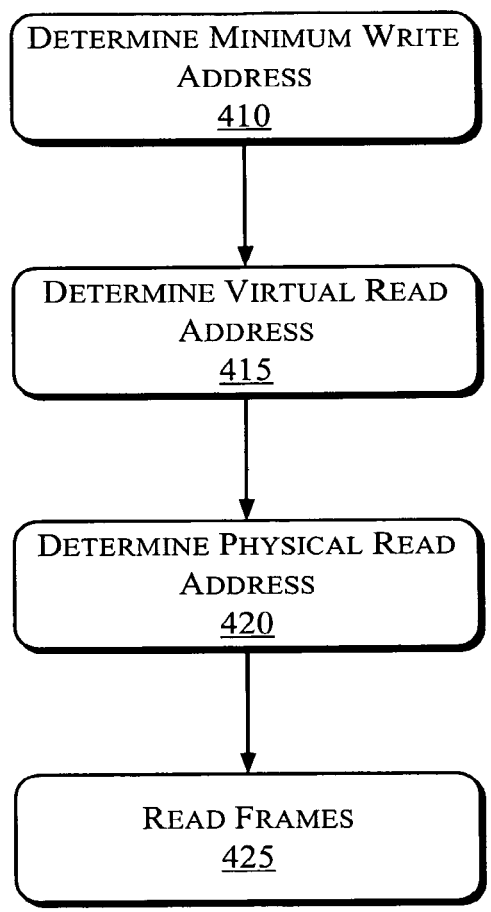
FIG. 4 is a flowchart illustrating operations in one embodiment of a method for reading data frames from a memory.

Referring to FIG. 4, at operation 410 a minimum write address for a group is determined from the virtual write addresses of all members belong to this group. In one embodiment the minimum write address may be determined by comparing the virtual write addresses of all members in the same group, and selecting the minimum write address. The minimum write address may be expressed using a multiframe indicator and a byte number.

At operation 415 a virtual read address is determined using the minimum write address. In one embodiment the virtual read address is determined by subtracting a threshold value equal to the write to read delay in memory from the minimum write address.

At operation 420 a physical read address is determined using the virtual read address. In one embodiment the physical read address for each member in a group may be determined using the relationship:

$$RAPhy(i)=WAPhy(i)-(WAVir(i)-RAVir)$$

where RAPhy (i) is the physical read address for member i, WAPhy (i) is the physical write address for member i, WAVir (i) is the virtual write address for member i, and RAVir is the virtual read address for the whole group.

Although the virtual read address is the same for the whole group, due to the address conversion, each member may have a different physical read address. From the virtual read address, the actual byte number and MFI value can be identified easily for any follow up processing.

The addressing scheme is illustrated schematically in FIG. 2B. Referring briefly to FIG. 2B, a group of three members 240-244 are shown. The J1 byte for member 240 is at byte 130, the J1 byte for member 242 is at byte 2103, and the J1 byte for member 2 is at byte 1027.

The current physical write addresses for each of members 240, 242, 244 is at byte 2105, which is indicated by hash marks in FIG. 2B. While in this example the physical write address for members 240, 242, 244 is the same, the physical write address may differ for members in the same group, e.g., due to different SONET pointer movements from different members. In this example:

WAPhy (0)=2105
WAPhy (1)=2105
WAPhy (2)=2105

The virtual write addresses for the respective members may be expressed in the format (MFI, byte number), as follows:

WAVir (0)=(i, 1975)
WAVir (1)=(i, 2)
WAVir (2)=(i, 1078)

For member 240, the byte at the current write address is byte number 1975 in frame i, so it is denoted (i, 1975). Similarly, for member 242, the byte at current write address is the second byte in frame i, so it is denoted as (i, 2). And for member 244, the byte at the current write address is byte number 1078 in frame i, so it is denoted as (i, 1078). Among the members 240, 242, 244, member 242 has the minimum virtual write address.

In the example presented in FIG. 2B the threshold between the group read address and the minimum write address of the group is 2. Thus, the current read address is at J1 byte of frame i, that is:

RAVir=(i, 0)

A common virtual read address may be assigned to the whole group. However, the values of physical read address are different for different members. Applying the relationship RAPhy (i)=WAPhy (i) (WAVir (i)–RAVir), the physical read addresses of the respective member may be determined, as follows:

RAPhy (0)=130
RAPhy (1)=2103
RAPhy (2)=1027

Figure 5:
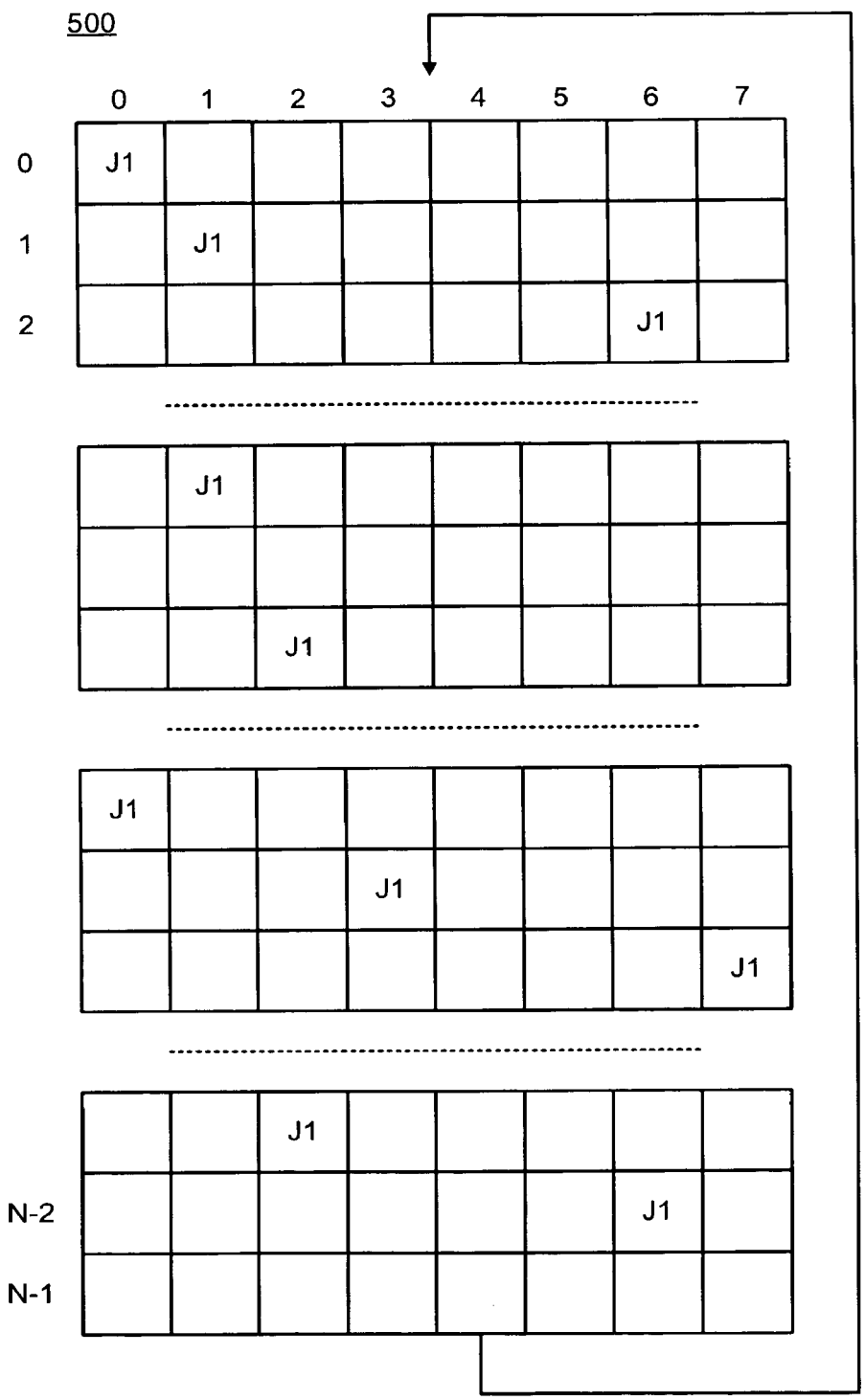
FIG. 5 is a schematic illustration of an eight-byte wide memory with N words in accordance with one embodiment.

The described addressing method can be applied to memory wider than one byte, and also to external memory (e.g., SDRAM). FIG. 5 is a schematic illustration of an eight-byte wide memory 500 with N words in accordance with an embodiment. Received data frames may be written continuously into the memory. Hence, any byte of the memory may store a J1 byte of a received data frame. The address translation described above for one-byte wide memory can be applied to an eight-byte wide memory. Further, the memory may be treated as a circular memory. Thus, when a write operation reaches the final byte of word N–1, the write operation can continue with the first byte of word zero.

Figure 6:
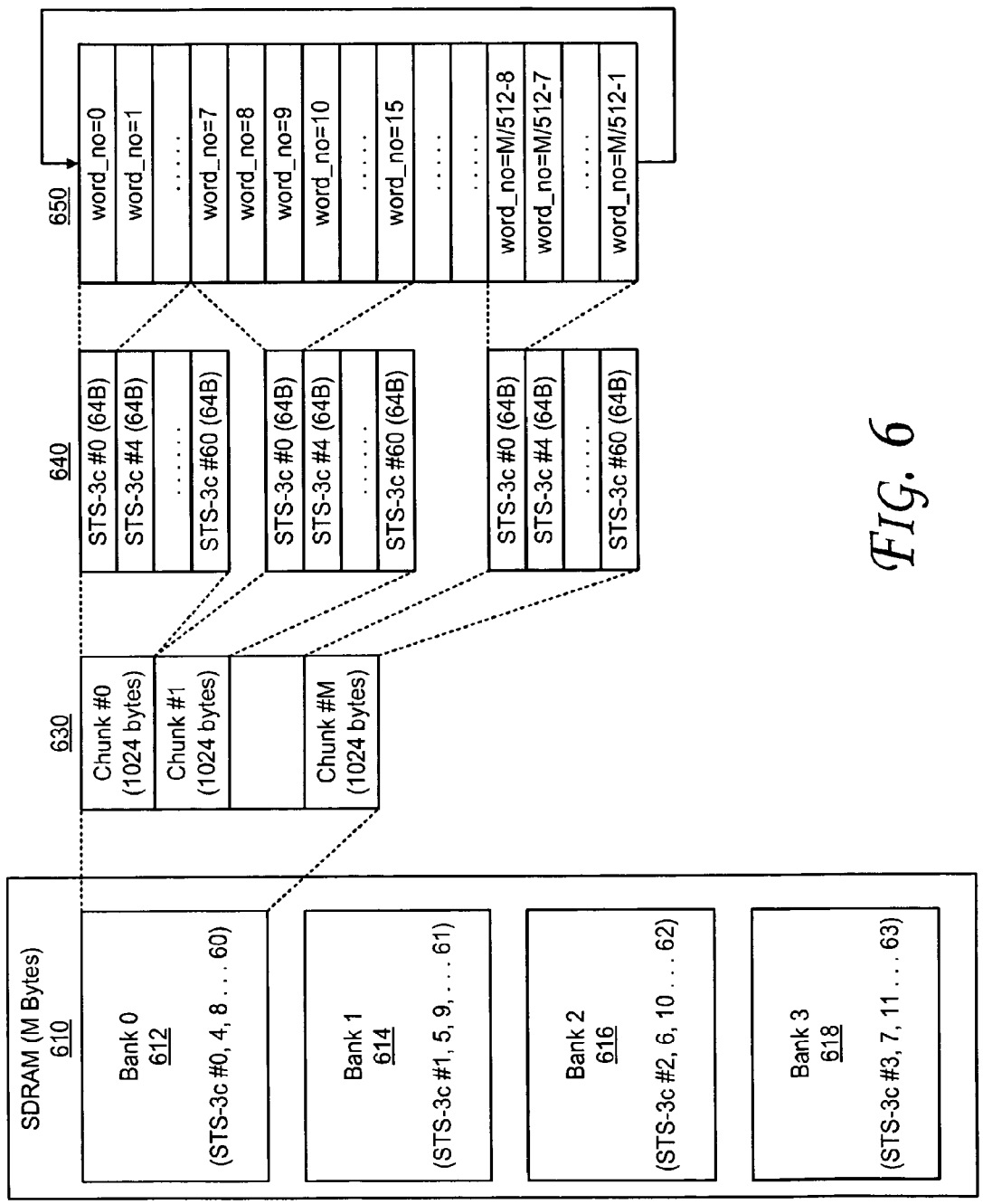
FIG. 6 is a schematic illustration of one embodiment of a memory architecture in which M bytes of SDRAM store 64 STS-3c members.

FIG. 6 is a schematic illustration of one embodiment of a memory architecture in which M bytes of SDRAM store 64 STS-3c members (e.g., for an OC-192 device). Hence, an M-byte block of SDRAM 610 is divided into four banks identified by bank 0 (612), bank 1 (614), bank 2 (616), and bank 3 (618). Each of the four banks of SDRAM 610 stores data from sixteen members. In the embodiment depicted in FIG. 6, bank 0 (612) stores data from the set of members (0, 4, 8 . . . 60), bank 1 (614) stores data from the set of members (1, 5, 9 . . . 61), bank 2 (616) stores data from the set of members (2, 6, 10, . . . 62), and bank 4 (618) stores data from the set of members (3, 7, 11, . . . 63). Separating members into different banks in the SDRAM 610 improves the access efficiency when reading from and writing to SDRAM 610.

In one embodiment each bank 612, 614, 616, 618 may be divided into chunks of 1024 bytes, illustrated in table 630. This allocates 64 bytes of memory to each of the sixteen members assigned to the bank, as illustrated in table 640. In turn, each 64 byte memory allocation is divided into eight words of memory, each of which is 8 bits in width, as illustrated in table 650. The memory may be treated as a circular memory. Thus, when a write operation reaches the final byte of word M/512-1, the write operation can continue with the first byte of word zero.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method, comprising:
   receiving a plurality of data frames at a destination node in a communications system;
   storing payload data from the received plurality of data frames in a memory, the plurality of data frames representing at least one virtually-concatenated data stream;
   recording a physical write address at which the plurality of received data frames is stored in the memory;
   recording a virtual write address for the plurality of received data frames to a memory location, the virtual write address including a corresponding multiframe indicator value for the plurality of received data frames and a byte number for a last received byte from the plurality of received data frames;
   determining a minimum write address by comparing virtual write addresses of all members in a group of associated data frames; and
   subtracting a threshold value equal to a write-to-read delay in the memory from the minimum write address to determine the virtual read address.

2. The method of claim 1, further comprising reading substantially contemporaneously from the memory the group of associated data frames identified by corresponding multiframe indicators and byte number indicators.

3. The method of claim 2, wherein the reading is based on determining the minimum write address from a plurality of physical write addresses in the group of associated data frames by comparing the virtual write addresses of all members in the group.

4. The method of claim 3, wherein the reading further comprises determining a physical read address for each member in the group of associated data frames based on the virtual read address.

5. The method of claim 1, wherein storing the payload data from the received plurality of data frames in the memory comprises writing received data into the memory in a continuous configuration with a continuous addressing algorithm such that the plurality of data frames is written into the memory in a circular manner and a first byte of at least two data frames is written into different relative addressing positions in at least one portion of the memory.

6. A computer-readable medium which is not a signal per se storing one or more instructions that, when executed by one or more hardware-based processors, configure at least one of the one or more hardware-based processors to perform operations comprising:
   receiving a plurality of data frames at a destination node in a communications system;
   storing payload data from the received plurality of data frames in a memory, the plurality of data frames representing at least one virtually-concatenated data stream;
   recording a physical write address at which the plurality of received data frames is stored in the memory;
   recording a virtual write address for the plurality of received data frames to a memory location, the virtual write address including a corresponding multiframe indicator value for the received plurality of data frames and a byte number for a last received byte from the received plurality of data frames;
   determining a minimum write address by comparing virtual write addresses of all members in a group of associated data frames; and
   subtracting a threshold value equal to a write-to-read delay in the memory from the minimum write address to determine the virtual read address.

7. A method comprising:
   Determining, by an apparatus, a virtual read address based on a minimum write address for a group of stored data frames, the stored data frames representing frames from at least one virtually concatenated data stream;
   determining a physical read address for each member in the group of stored data frames based on the virtual read address; and
   reading frame data based on a determination of the physical read addresses for each of the plurality of members of the group, the frame data being further identified by corresponding multiframe indicators and byte number indicators.

8. The method of claim 7, further comprising determining a virtual write address for each member in the group, the virtual write address including a corresponding multiframe indicator value from the corresponding multiframe indicators for the group and a byte number for a last received byte from the group; and determining a physical write address for each member in the group.

9. The method of claim 8, further comprising:
   determining a minimum write address by comparing each of the virtual write addresses of each of the plurality of members within the group; and selecting an address having the lowest value of each of the virtual write addresses.

10. The method of claim 7, further comprising subtracting a threshold value equal to a write-to-read delay in memory from the minimum write address to determine the virtual read address.

11. The method of claim 7, further comprising expressing the minimum write address using a multiframe indicator and a byte number selected from the corresponding multiframe indicators and the byte number indicators.

12. A computer-readable medium which is not a signal per se storing one or more instructions that, when executed by one or more hardware-based processors, configure at least one of the one or more hardware-based processors to perform operations comprising:
   determining a virtual read address based on a minimum write address for a group of stored data frames, the stored data frames representing frames from at least one virtually concatenated data stream;
   determining a physical read address for each member in the group of stored data frames based on the virtual read address; and
   reading frame data based on a determination of the physical read addresses for each of the plurality of members of the group, the frame data being further identified by corresponding multiframe indicators and byte number indicators.

13. A method, comprising:
   receiving a plurality of data frames at a destination node in a communications system;
   storing payload data from the received plurality of data frames in a memory;
   recording a virtual write address for the plurality of received data frames to a memory location, the virtual write address including a corresponding indicator value for the plurality of received data frames and a byte number for a last received byte from the plurality of received data frames;
   determining a minimum write address by comparing virtual write addresses of all members in a group of associated data frames; and
   subtracting a threshold value equal to a write-to-read delay in the memory from the minimum write address to determine the virtual read address.

14. The method of claim 13, wherein the plurality of data frames represents at least one virtually-concatenated data stream.

15. The method of claim 13, further comprising storing the received plurality of data frames in the memory continuously.

16. The method of claim 13, further comprising recording, for each of the received plurality of data frames, a physical write address indicating a position of an associated data frame in the memory.

17. The method of claim 13, further comprising receiving the plurality of data frames substantially contemporaneously from a plurality of different communication channels coupled to the destination node in the communications system.

18. An apparatus, comprising:
   a receiver to receive a plurality of data frames representing at least one virtually concatenated data stream;
   a hardware-based computer processor to
   store the received plurality of data frames in a memory,
   record, for each of the received plurality of data frames, a virtual write address including a multiframe indicator associated with the received data frame and a byte number indicator, and
   read from the memory a group of associated data frames identified by corresponding multiframe indicators and byte number indicators;
   determine a minimum write address by comparing virtual write addresses of each of the members in a group of associated data frames; and
   subtract a threshold value equal to a write-to-read delay in the memory from the minimum write address to determine the virtual read address.

19. The apparatus of claim 18, wherein the hardware-based computer processor is further configured to perform the read substantially contemporaneously based on a determination of ft the minimum write address from a plurality of physical write addresses in the group of the associated data frames by comparing the virtual write addresses of each of the members in the group.

20. The apparatus of claim 19, wherein the hardware-based computer processor is further to increment each of the plurality of physical write addresses as each of the plurality of data frames is received.

* * * * *